May 30, 1939.  W. H. HUTCHINS  2,160,740

ROOM THERMOSTAT

Filed April 10, 1936

Inventor
William H. Hutchins
By Blackmore, Spencer & Flint
Attorneys

Patented May 30, 1939

2,160,740

UNITED STATES PATENT OFFICE 2,160,740

ROOM THERMOSTAT

William H. Hutchins, Rochester, N. Y., assignor to General Motors Corporation, Detroit, Mich., a corporation of Delaware Application April 10, 1936, Serial No. 73,621

1 Claim. (Cl. 200—138)

This invention relates generally to thermostatic electric switches and more particularly to that type of switch which is termed a room thermostat and employed in electric circuits such as for operating dampers in domestic heating systems and for controlling the operation of domestic fluid fuel burners.

When used in domestic heating systems of any character, the thermostat is located in the room of the dwelling in which it is most desirable to maintain a practically uniform temperature. The operation of the thermostat is controlled by some means responsive to temperature changes, such as a coil of thermostatic metal or a bi-metallic coil, or a bellows or the like containing a fluid which expands or contracts in response to changes of temperature of the surrounding atmosphere, and is adapted to open or close an electric switch at a certain temperature in the room.

To maintain practically uniform temperature, it is highly desirable that the thermostat will respond quickly to any changes in the temperature of the surrounding atmosphere, and in conventional thermostats it has been found that the mass of the unit as well as adjacent objects has the effect of retarding the immediate response to room temperature changes. Also in many instances there is a stratification or poor circulation of the air in the immediate vicinity of the thermostat so that it does not respond properly to changes in the average room temperature.

It is therefore the object of this invention to provide a thermostatic electric switch or room thermostat in which there is a positive circulation of air over the thermostatic element at all times to thereby maintain the temperature of this element at the same temperature as that in the room in which the thermostat is placed, and cause the thermostat to respond quickly to any temperature changes.

With this and other objects in view, the invention consists in the provision of a small motor driven fan which is associated with the thermostat in such a way as to circulate air over the thermostatic element at all times.

Figure 1:
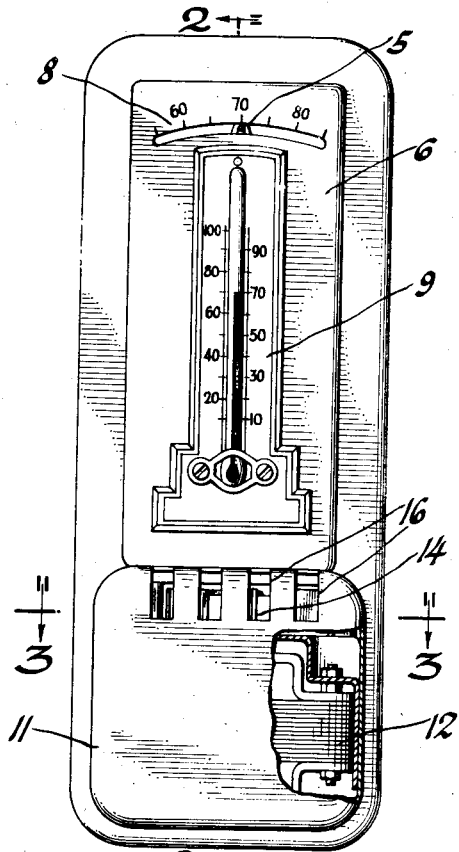
Fig. 1 is a view in front elevation with parts broken away of one embodiment of the invention.
Figure 2:
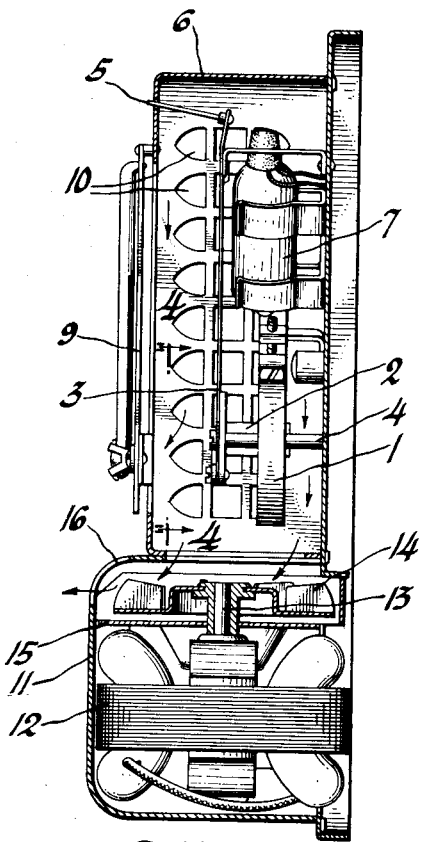
Fig. 2 is a vertical cross section taken substantially on line 2—2 of Fig. 1.
Figure 4:
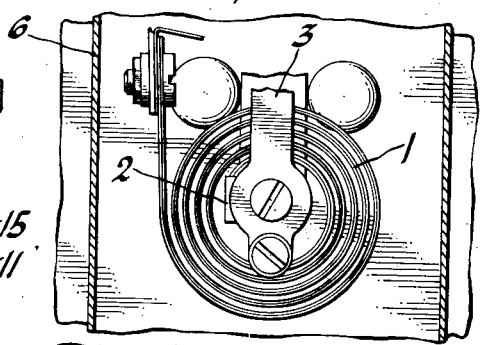

Fig. 4 is a fragmentary view of the thermostatic element taken substantially on line 4—4 of Fig. 2.

As this invention relates primarily to the addition or association of an air circulating fan with the thermostatic element of the room thermostat or other type of thermostatic electric switch, it will be understood that the thermostatic element and switch and switch operating mechanism may be of any conventional or standard construction.

There has, therefore, been shown rather diagrammatically a room thermostat of conventional internal construction in which the thermostatic element takes the form of a bi-metallic coil 1. The inner end of this coil is secured to an arm 2 on the adjusting member 3 mounted on shaft 4. This adjusting member 3 extends upwardly and has an outward extension 5 through the front face of the thermostat casing 6 to constitute a handle for adjusting the angular position of the thermostatic element on the shaft 4 in the usual manner.

The outer end of the bi-metallic coil 1 extends upwardly and carries a permanent magnet which is adapted to be moved toward and away from the mercury tube 7 in response to temperature changes affecting the coil. This magnet serves to close switch contacts in the mercury tube when moved toward or when it approaches to within a predetermined distance from the tube, and permit the contacts in the tube to open when moved away from the tube.

The casing 6 is provided on its front face with a calibrated scale 8 which is associated with the extension 5 of the adjusting member, and also mounts the usual thermometer 9. The side walls of the casing 6 are formed with a plurality of openings 10 and the bottom of the casing 6 opens into a housing 11.

The housing 11 contains a small electric motor 12 which has a vertical shaft 13 carrying a fan or blower 14 at its upper end. A partition 15 is provided in the housing 11 between the motor and fan and it will be noted that the space above this partition in which the fan is located communicates directly with the interior of the casing 6 at the bottom thereof.

Figure 3:
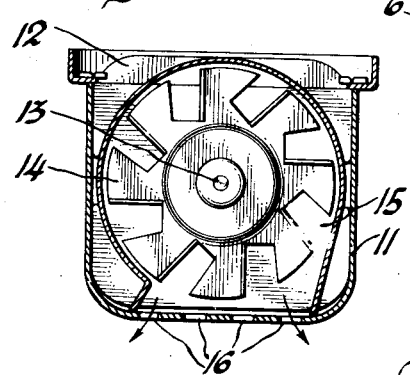
Fig. 3 is a horizontal cross section taken substantially on line 3—3 of Fig. 1.

The front of the housing 11 is formed with a plurality of openings 16 above the partition 15, and the fan 14 is adapted to draw air through the side openings 10 in the casing 6 and discharge the air through the openings 16 as shown by the arrows in Figs. 2 and 3.

When the motor 12 is operating it will therefore be seen that the fan or blower will function to provide a continuous and positive circulation of air over the thermostatic element. It is contemplated that the motor would be operated throughout the winter months when the room thermostat is in use and a manual switch provided in the motor circuit to shut off the motor, if desired, during the summer months.

Although the fan or blower has been disclosed as adapted to draw air downwardly over the thermostatic element, it will be understood that the fan or blower can be so arranged as to blow the air over the thermostatic element, and in fact, located with reference thereto in any desired manner that would serve to provide for a positive circulation of air.

It should also be understood that the motor and fan unit can be so constructed and arranged as to be readily associated with any conventional room thermostat or other type of thermostatic electric switch, and various other changes and modifications are possible without departing from the scope of the present invention.

I claim:

The combination in a room thermostat, of an electric switch and a thermostatic element for operating said switch, an electric motor, and a fan driven thereby, means substantially enclosing all of said elements and providing a plurality of chambers comprising a first chamber enclosing said switch and thermostatic element, a second chamber enclosing said fan, and a third chamber enclosing said motor, said first and second chambers communicating with each other and formed with air inlet and outlet openings whereby said fan will circulate air from outside of said means over said thermostatic element.

WILLIAM H. HUTCHINS.